United States Patent [19]
Brisson et al.

[11] Patent Number: 5,920,468
[45] Date of Patent: Jul. 6, 1999

[54] AC LINE FILTER NETWORK FOR VIDEO APPLICATIONS

[75] Inventors: Timothy A. Brisson, Auburn; Ralph H. Williams, Nevada City, both of Calif.

[73] Assignee: Constant Velocity Transmission Lines, Inc., Auburn, Calif.

[21] Appl. No.: 08/921,349

[22] Filed: Aug. 29, 1997

[51] Int. Cl.$^6$ ................................................... H02M 1/12
[52] U.S. Cl. .............................. 363/39; 333/174; 333/175
[58] Field of Search ..................... 363/39, 40, 44, 363/45, 46, 47; 333/173, 174, 175, 176

[56] References Cited

U.S. PATENT DOCUMENTS

| | | | |
|---|---|---|---|
| 5,227,962 | 7/1993 | Marsh | 363/39 |
| 5,251,120 | 10/1993 | Smith | 363/44 |
| 5,260,862 | 11/1993 | Marsh | 363/39 |

*Primary Examiner*—Edward H. Tso
*Assistant Examiner*—Y. J. Han
*Attorney, Agent, or Firm*—Jill L. Robinson

[57] ABSTRACT

A filter network adapted to be placed in parallel with a power supply which acts like a short circuit at a specified frequency range above 80 kHz. The filter network comprises a plurality of parallel circuits, each of which comprise a capacitor, an inductor and a resistor in series with a second resistor coupled in parallel with the inductor.

7 Claims, 3 Drawing Sheets

AC LINE FILTER NETWORK FOR VIDEO APPLICATIONS

BACKGROUND OF THE INVENTION

1. Field of the Invention

The present invention relates to AC power supplies for supplying power to video signal generating and transmission equipment in general and in particular to a method and apparatus comprising a filter network for providing a low and relatively stable impedance to frequencies between 80 kHz and 3.8 Mhz.

2. Description of the Related Art

As described in U.S. Pat. Nos. 5,227,962 (the "'962 Patent") and 5,260,862 (the "'862 Patent"), both of which are incorporated herein by reference, it is known that certain audio equipment is sensitive to high frequency noise induced fluctuations in the impedance of a conventional 60 Hz power source providing power to the equipment. This sensitivity can adversely affect the quality, e.g. fidelity or clarity, of and generate noise in the audio signals being propagated in the equipment. Audio equipment is also sensitive to the amount of power being delivered to the equipment. If too little power is delivered, the dynamic range of the equipment is degraded.

The '962 and '862 patents teach the use of a set of multiple series resonant circuits which are placed in parallel across the AC utility power line for audio equipment. The circuits may be configured to provide a high impedance to frequencies at and below the 60 Hz range and a low impedance above the 60 Hz range, and to increase the power factor.

Although video equipment may also be affected by noise and power factor considerations, it was not known whether a higher frequency range of noise, significantly above 60 Hz, existed on the AC utility power line, nor if such higher frequency noise would be transferred to the video equipment connected to the line. Thus, the related art did not recognize or predict that application of resonance circuits with center frequencies within specific frequency ranges, including frequencies significantly higher than 60 Hz and the audio frequency range, could be placed in parallel to the AC utility power lines for video equipment, alone or in conjunction with filters similar to those taught in the '962 and '862 patents, to achieve both an improvement in the effects of noise and a measurably brighter image.

SUMMARY OF THE INVENTION

In view of the foregoing, principal objects of the present invention are a method and apparatus comprising a filter network which can be coupled to a source of AC power supplying video equipment, for providing a low, preferably negligible and relatively stable impedance to frequencies between 80 kHz and 3.8 MHz.

In accordance with the above objects there is provided a filter network as described above which is adapted to be plugged into one of the female sockets in a conventional duplex socket, a conventional power strip or the like, for providing the above described impedance. In this manner the filter network is placed in parallel with the lines supplying power to the video equipment at a point near the equipment.

In one embodiment of the present invention, the filter network comprises a plurality of parallel coupled resonant circuits. Each of the resonant circuits has a different resonant frequency between 80 kHz and 3.8 MHz and comprises an inductor coupled in series with a capacitor.

The resonant circuits may include resistances coupled in series and/or in parallel with the inductor and/or capacitor in each of the resonant circuits for damping oscillatory or ringing behavior of the circuit, and a resistance may be coupled in parallel with the inductor in each of the resonant circuits for limiting the normal impedance rise due to the inductive impedance of the inductor as a function of an increase in frequency.

Switches may be provided in series with one or more of the resonant circuits for use by operators to selectively change the impedance of the filter networks.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWINGS

The method and apparatus of the present invention comprises a filter compensation network that when bridging an AC power line will make the AC power line appear to have a very low, preferably negligible, and relatively stable impedance at higher frequencies up to 3.8 MHz. Capacitors are provided in the network and may be selectable. As will be further described below, the device is placed across the AC utility power line and therefore is not in the series path between the utility power and the equipment being powered.

The device of the present invention comprises multiple series resonant circuits which are placed in parallel across the AC utility power line wherein each of the series resonant circuits is tuned to a different frequency between 80 kHz and 3.8 MHz.

Figure 1:
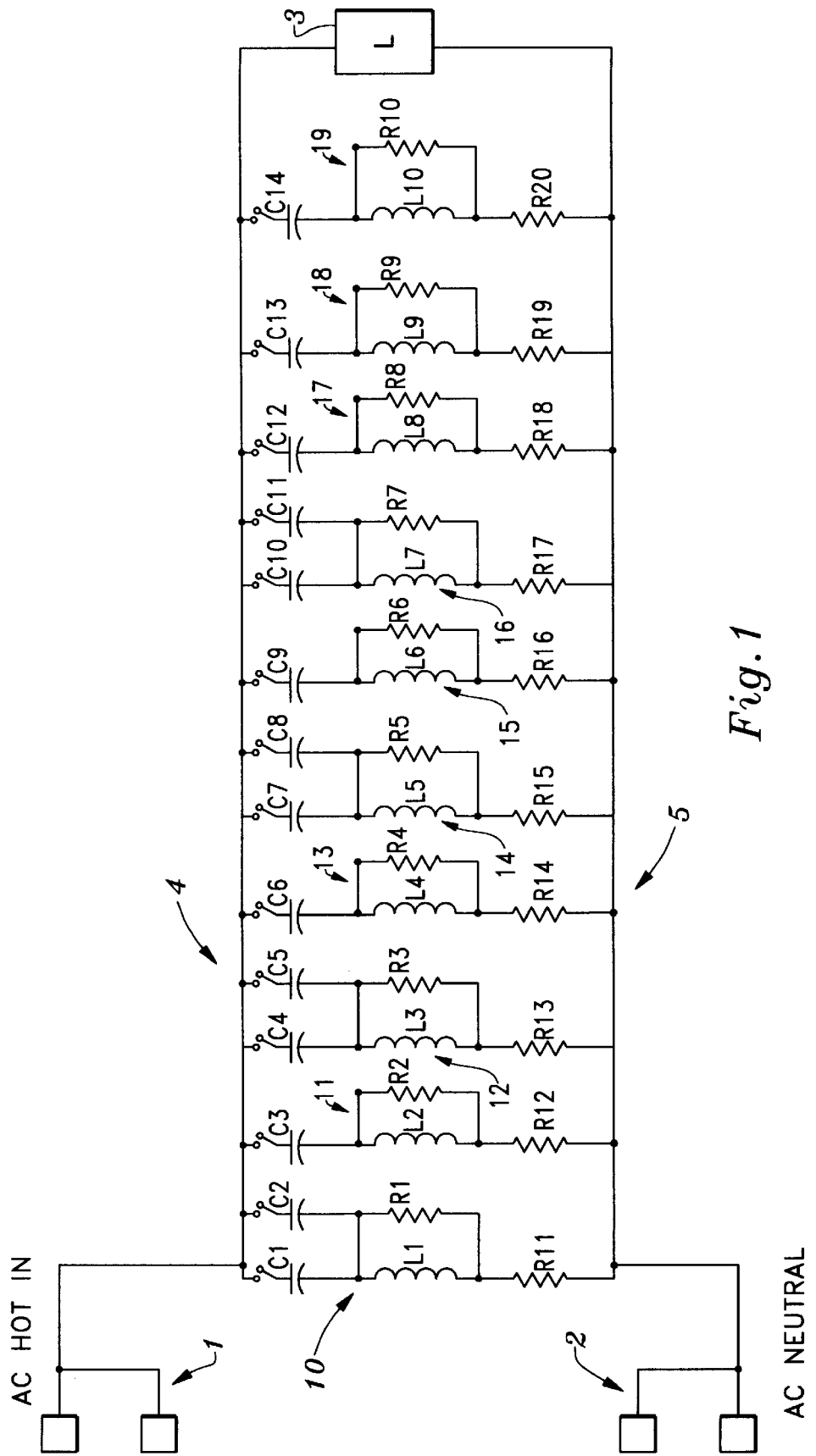
FIG. 1 is a specific embodiment of a filter network according to the present invention.

Referring to FIG. 1, there are shown hot and neutral input terminals for connecting to a source of AC power 1, 2 (such as a conventional 60 Hz, 120 volt source), which is coupled to a load 3 (such as video signal generating and transmission apparatus, or a television), by means of a first and a second power supply line 4 and 5. Coupled in parallel across the source power supply lines there are provided a plurality of resonant circuits 10, 11, 12, 13, 14, 15, 16, 17, 18, 19.

As shown, the capacitive portion of certain of the resonant circuits, 10, 12, 14, 16, comprise two capacitors coupled in parallel: C1 and C2; C4 and C5; C7 and C8; C10 and C11; while the capacitive portion of other resonant circuits 11, 13, 15, 17, 18, 19, comprise one capacitor: C3, C6, C9, C12, C13, C14. Persons of ordinary skill in the art will realize that a substitution of a single capacitor with the same value as the combination of parallel coupled capacitors is a design choice and would not affect the resonant frequency of the circuit. Coupled in series with each of the capacitive portion of the RLC circuits there is provided an inductor L1–L10, respectively. A plurality of resistors R11–R20 are coupled in series with inductors L1–L10, respectively. Coupled in parallel with each of the inductors L1–L10 in the circuits 10–19 there is provided a plurality of resistors R1–R10, respectively. The above-described capacitors, inductors and resistors of FIG. 1 have the following typical values:

| | |
|---|---|
| C1–C3 = | .047 μf |
| C4–C7 = | .01 μf |
| C8–C9 = | 4700 pf |
| C10 = | 2200 pf |
| C11 = | 1000 pf |
| C12 = | 2200 pf |
| C13 = | 1000 pf |
| C14 = | 470 pf |
| L1–L4 = | 39 μH |
| L5–L10 = | 3.9 μH |
| R1–R10 = | 27.0 ohms |
| R11–R20 = | .47 ohms | where μf and pf are designations for microfarad and picofarad, and μH is a designation for microhenry. The resulting circuit creates a set of notch filters centered at approximately the following frequencies:

| | |
|---|---|
| F1 = | 83 kHz |
| F2 = | 118 kHz |
| F3 = | 180 kHz |
| F4 = | 255 kHz |
| F5 = | 664 kHz |
| F6 = | 1.17 MHz |
| F7 = | 1.42 MHz |
| F8 = | 1.72 MHz |
| F9 = | 2.55 MHz |
| F10 = | 3.717 MHz |

The inventors discovered that placement of the center frequency of the last notch filter could advantageously be placed close to the 3.58 MHz television color subcarrier frequency. When two television receivers are in close proximity and are plugged into the same AC circuit, this configuration may be used to reduce the amount of crosstalk noise from one TV receiver to the other on the AC power line.

In the embodiments of FIG. 1 an optional switch S may be provided to enable an operator to selectively remove one or more of the resonant circuits from the network as desired, and thereby adjust the frequency range of the circuit. Furthermore, although in the embodiment shown RLC circuits are used, it will be understood that resonant circuits similar to those described in FIGS. 3, 4 and 7 of the '862 and '962 Patents could also be used, and that the number of RLC, or other resonant, circuits could be increased or decreased.

Figure 2:
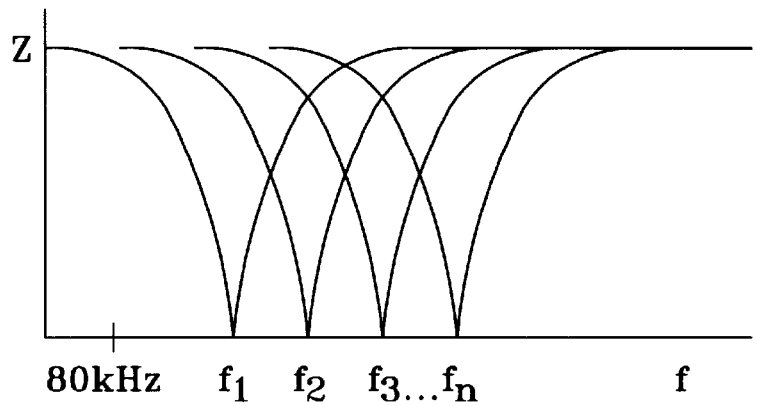
FIG. 2 is an idealized, representative plot of impedance v. frequency of the RLC resonant circuits of FIG. 1.

Referring to FIG. 2, there is shown a idealized, representative plot of impedance v. frequency for each of the resonant circuits in FIG. 1. As shown in FIG. 2 a low, e.g. close to zero, impedance node exists at each of the frequencies F1–Fn, where n, in the case of the circuits in FIG. 1, is equal to 10, and Fn for the circuit shown in FIG. 1 is equal to approximately 3.717 MHz.

Figure 3:
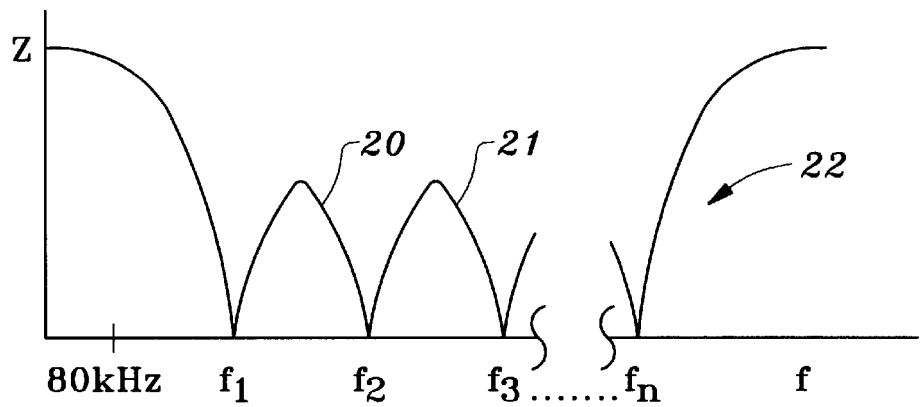
FIG. 3 is a representative plot of the combined resultant of the impedance v. frequency for the resonant circuits of FIG. 1.

Referring to FIG. 3, there is shown the combined resultant of the impedance versus frequency curves of FIG. 2. When the impedance curves of FIG. 2 are combined, it can be seen that the impedance of the circuits of FIG. 1 is substantially reduced between the frequencies F1 and Fn as shown by the curves 20,21, and 22.

Figure 4:
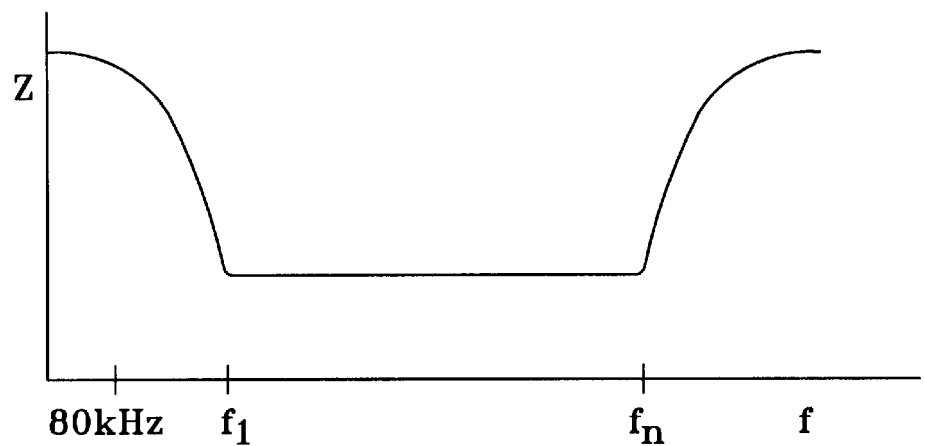
FIG. 4 is a representative plot of impedance v. frequency showing that the impedance of the circuit of FIG. 1 can be made relatively constant over a wide frequency range.

Referring to FIG. 4, there is shown a representative plot of the impedance v. frequency for the circuit of FIG. 1, wherein the impedance of the circuit between the frequencies F1 and Fn is substantially independent of frequency.

Figure 5:
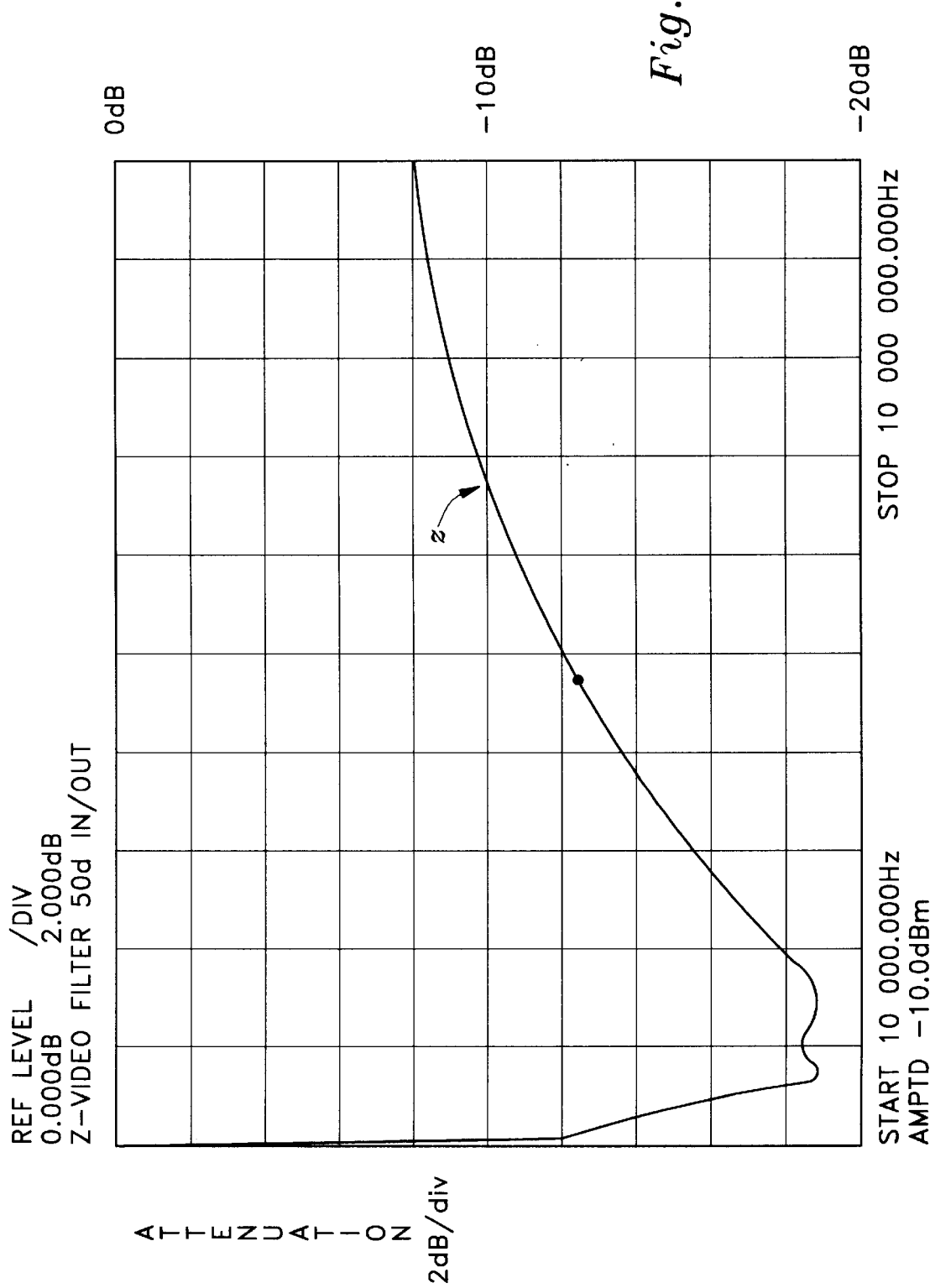
FIG. 5 is a plot of impedance and phase shift for the circuit of FIG. 1.

Referring to FIG. 5, there is shown a plot of gain, i.e. attenuation versus frequency for the circuit of FIG. 1. As will be seen from the plot in FIG. 5, the circuit of FIG. 1 attenuates the output power from the source 1 as a function of frequency wherein the attenuation begins at around 80 kHz and reaches a maximum of −18–19 dB at around 1 MHz and remains below −8 bB through 10 MHz such that the impedance of the power source as seen by the load 3 has a very low impedance between the supply lines for frequencies between 80 kHz and 3.8 MHz. Maintaining this low impedance will reduce the noise on the line.

The filter network may be embodied in a device which can be plugged into one of the two pairs of sockets in a conventional duplex power socket. The network could be plugged into a conventional power strip adjacent to the plugs of the video equipment.

While preferred embodiments of the present invention are described above, it is contemplated that numerous modifications may be made thereto for particular applications without departing from the spirit and scope of the present invention. For example, while the network of FIG. 1 is described as comprising ten stages, there are no theoretical limits to the number of such resonant circuit stages that may be used to extend the low impedance range to cover a wider frequency span and/or a wider range of inductive reactance of loads coupled thereto than that achieved with the network of FIG. 1. In addition, by adjusting the frequency range, the present invention may have applications in other video-related applications, such as X-ray equipment, medical imaging equipment and electronic microscopes, or any other application in which noise within particular frequency ranges may be transmitted to a noise sensitive load through the medium of the AC power line. It also may be advantageous to combine the circuit of the current invention with the inventions described in the '962 and '862 patents, particularly in the case where both audio and video equipment are connected to the same AC source or power line. Accordingly, it is intended that the embodiments described be considered only as illustrative of the present invention and that the scope thereof should not be limited thereto but be determined by reference to the claims hereinafter provided.

What is claimed is:

1. An apparatus for coupling a source of AC power to a noise-sensitive load and for providing a low and stable impedance at frequencies above 80 kHz at the power supply input of the load coupled thereto, said source having a first and second power supply line, comprising a filter network having a plurality of parallel circuits, each of said circuits comprising a resistor, an inductor and a capacitor coupled in series for providing a plurality of resonant frequency nodes at frequencies above 80 kHz and an absorption of energy at frequencies above 80 kHz; and means for coupling each of said circuits in said filter network in parallel with said source between said first and second power supply lines.

2. An apparatus in accordance with claim 1, wherein each of said circuits further comprises a resistor coupled in parallel with said inductor for providing with respect to frequencies above a predetermined frequency a substantially zero degree phase shift between the current and voltage therein.

3. An apparatus in accordance with claim 2 wherein each of said circuits further comprises a switch means coupled in series with selected ones of said series coupled capacitors and inductors.

4. A apparatus according to claim 1 wherein the total capacitance in each of said plurality of circuits has a value between approximately 470 picofarads and approximately 0.094 microfarads.

5. An apparatus according to claim 1 wherein the frequency nodes include nodes at the frequencies of 83 kHz, 118 kHz, 180 kHz, 255 kHz, 664 kHz, 1.17 MHz, 1.42 MHz, 1.72 MHz, 2.55 MHz and 3.717 MHz.

6. An apparatus according to claim 1 wherein the frequency nodes are between 80 kHz and 3.8 MHz.

7. An apparatus according to claim 1 wherein the frequency nodes includes a frequency node is close to 3.58 Mhz.

* * * * *